United States Patent
Lu et al.

(10) Patent No.: US 7,199,852 B1
(45) Date of Patent: Apr. 3, 2007

(54) FRINGE FIELD SWITCHING LIQUID CRYSTAL DISPLAYS USING TRAPEZOID ELECTRODES

(75) Inventors: Ruibo Lu, Orlando, FL (US); Qi Hong, Orlando, FL (US); Shin-Tson Wu, Oveido, FL (US)

(73) Assignees: Research Foundation of the University of Central Florida, Incorporated, Orlando, FL (US); Toppoly Optoelectronics Corp., Miao-Li (TW)

( * ) Notice: Subject to any disclaimer, the term of this patent is extended or adjusted under 35 U.S.C. 154(b) by 89 days.

(21) Appl. No.: 10/994,118

(22) Filed: Nov. 19, 2004

(51) Int. Cl.
*G02F 1/1343* (2006.01)

(52) U.S. Cl. .................. 349/141; 349/145; 349/146
(58) Field of Classification Search ................ 349/141, 349/145, 146
See application file for complete search history.

(56) References Cited

U.S. PATENT DOCUMENTS

| | | | |
|---|---|---|---|
| 5,886,762 A | 3/1999 | Lee et al. | 349/141 |
| 6,266,116 B1 * | 7/2001 | Ohta et al. | 349/141 |
| 6,466,290 B2 | 10/2002 | Kim et al. | 349/141 |
| 6,522,380 B2 | 2/2003 | Lee et al. | 349/141 |
| 2002/0018166 A1 * | 2/2002 | Matsumoto et al. | 349/141 |
| 2002/0033922 A1 * | 3/2002 | Hidehira et al. | 349/141 |
| 2002/0131006 A1 * | 9/2002 | Yang | 349/141 |

* cited by examiner

*Primary Examiner*—Toan Ton
(74) *Attorney, Agent, or Firm*—Brian S. Steinberger; Phyllis K. Wood; Law Offices of Brian S. Steinberger, P.A.

(57) ABSTRACT

Structures, devices, systems and methods of using fringe field switching mode liquid crystal display (LCD) in which the electrodes have a trapezoidal structure. The disclosed fringe field switching mode LCD includes common electrodes and pixel electrodes arranged on a back substrate to produce a fringe field. Each electrode is comprised of alternating sections of main bone and trapezoidal electrode.

1 Claim, 14 Drawing Sheets

FRINGE FIELD SWITCHING LIQUID CRYSTAL DISPLAYS USING TRAPEZOID ELECTRODES

This invention relates to an improved structure of fringe field switching liquid crystal displays, and more specifically to a structure, device, system, and method of a liquid crystal display with trapezoid electrodes with fast response, high transmittance, low operating voltage, and wide view angle.

BACKGROUND AND PRIOR ART

Liquid crystal displays (LCDs) have been widely used in graphic displays and TVs. Fast response, high transmittance, and wide view angle are the main requirements for high display quality that is critically required in large size monitors and TV applications. At present, the twisted nematic (TN) and super twisted nematic (STN) display devices are the main commercial products in the LCD market. Unfortunately, their inherent narrow view angle ability hinders them from going further. As one of the promising candidates, in-plane switching (IPS) mode liquid crystal display has been introduced for getting the high display quality in these areas.

The IPS concept was first published by R. A. Soref in Applied Physics Letters, vol. 22, p.165 (1973) and the Journal of Applied Physics vol. 45, p. 5466 (1974). In 1992, Kiefer et al extended this operating principle to display devices and later Hitachi Japan developed it into commercial products. Referring to FIG. 1, in an IPS LCD 100, the electric field 105 is applied in the transverse direction and the LC molecules 110 in between the neighboring electrodes 115 are rotated in the same plane as the electrodes 115. Therefore, IPS mode LCD typically exhibits a wide view angle. From FIG. 1, the electric field 105 in the center of the electrodes 115 is zero so that the molecules do not rotate and result in a dark area between crossed polarizers 120, 125. The light efficiency of an IPS LCD is about 50–60% of the conventional TN LCD. The response time of a 4-μm IPS LC cell is approximately 25–30 ms.

To reduce response time and improve transmittance, S. H. Lee et al narrowed the distance between the neighboring electrodes 205, 215 to smaller than the width of the electrode and cell gap 210 as shown in FIG. 2. Under this condition, the electric field lines would be created in parabolic-like form and a fringe field effect would form in the whole substrate area. The IPS mode is transferred to the so-called fringe field switching (FFS) mode. Their results were published in Applied Physics Letters, vol.73, p.2881 (1995), and disclosed in U.S. Pat. No. 5,886,762 in 1999, U.S. Pat. No. 6,466,290 B2 in 2002 and U.S. Pat. No. 6,522,380 B2 in 2003.

In their electrode configuration, the rectangular shape or straight shape electrodes were used to produce the fringe field between the neighboring electrodes. This operation mode is defined as conventional FFS mode. The FFS mode needs a relatively high operating voltage (>6 $V_{rms}$) and, preferably, a negative dielectric anisotrophy (Δε) liquid crystal material is used. The negative Δε LCs are more difficult to produce and have a higher viscosity.

Thus, there is a need for a new LCD structure that exhibits faster response time, higher transmittance, and wider view angle, where both positive (Δε>0) and negative dielectric (Δε<0) LC materials can be used.

SUMMARY OF THE INVENTION

A primary objective of the present invention is to provide structure, device, system and method for providing an improved fringe field switching (FFS) mode LCD that exhibits a fast response time.

A secondary objective of the present invention is to provide structure, device, system and method for providing a FFS mode LCD that exhibits high transmittance.

A third objective of the present invention is to provide structure, device, system and method for providing a FFS mode LCD that has a wide view angle.

A fourth objective of the present invention is to provide structure, device, system and method for providing a FFS mode LCD with low operating voltage.

A fifth objective of the present invention is to provide structure, device, system and method for providing a FFS mode LCD where both positive and negative dielectric LC materials can be used.

The preferred embodiment of the present invention include a fringe field switching mode LCD with trapezoid-electrode configuration (T-FFS), device, system and method. The invention provides a new device structure for achieving fast response time, high transmittance, and wide view angle using the trapezoid electrodes, where both positive (Δε>0) and negative dielectric (Δε<0) LC materials can be used. The pixel and common electrodes are each in the form of alternating sections of main bone electrode with trapezoidal shaped electrode. The trapezoidal section of a pixel electrode is disposed adjacent to a main bone section of a common electrode and the main bone section of a pixel electrode is disposed adjacent to a trapezoidal section of a common electrode.

Further objectives and advantages of this invention will be apparent from the following detailed descriptions of the presently preferred embodiments that are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
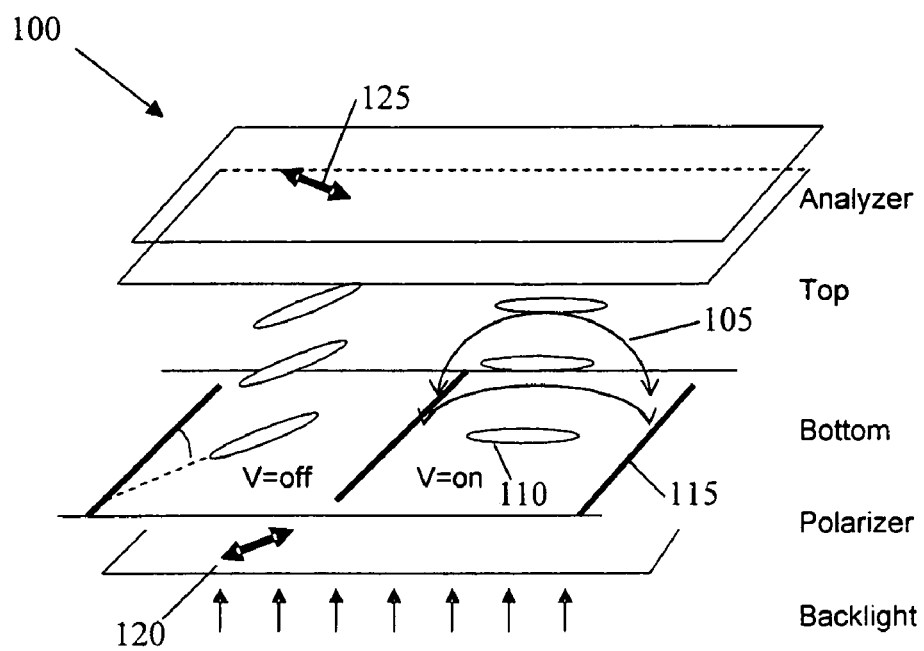
FIG. 1 shows a general structure of an in-plane-switching LCD of the prior art.
Figure 2:
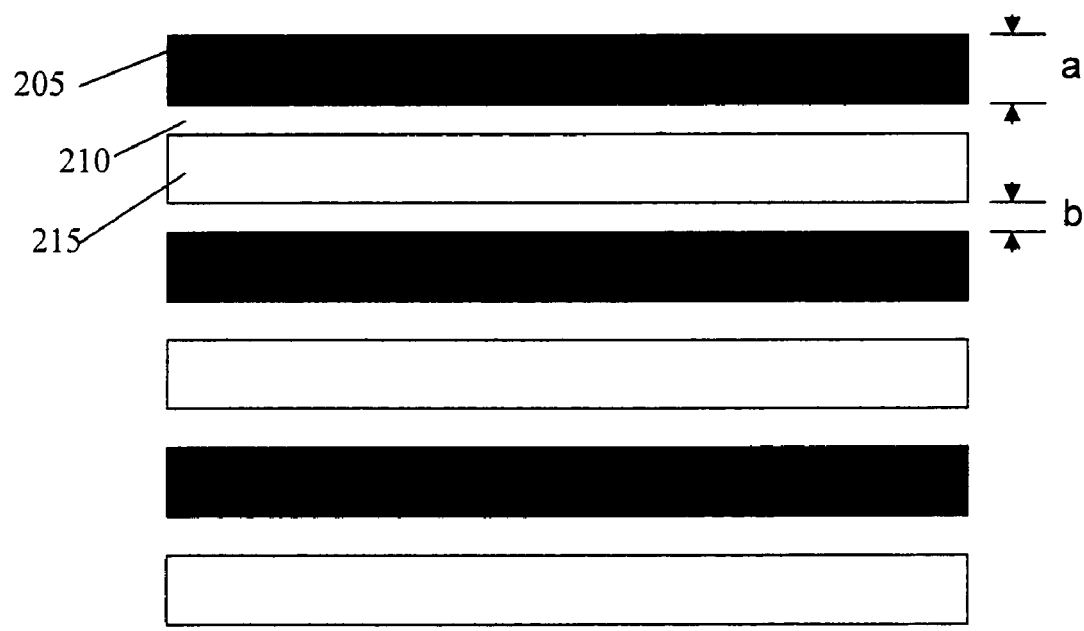
FIG. 2 shows a prior art general electrode structure of the conventional FFS mode LCD.
Figure 3A:
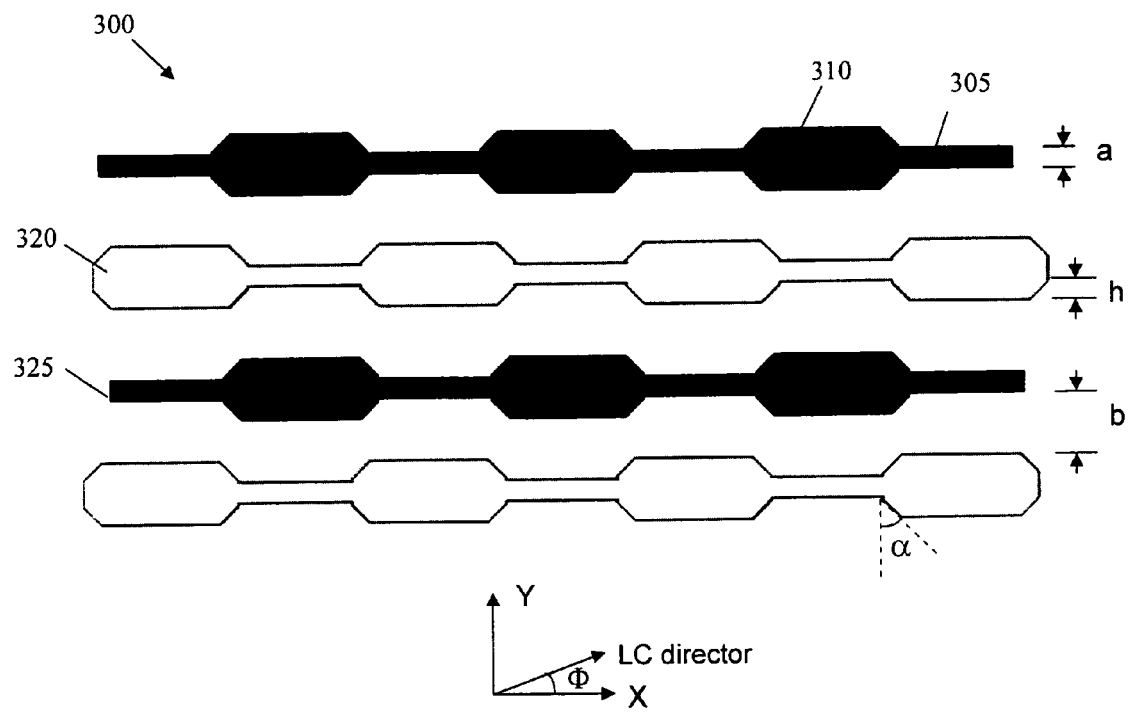
FIG. 3a shows a plan view of the trapezoid electrode configuration of the T-FFS mode.

The invention provides a new device structure for achieving fast response time, high transmittance, and wide view angle using the trapezoid electrodes, where both positive ($\Delta\epsilon>0$) and negative dielectric ($\Delta\epsilon<0$) LC materials can be used. As shown in FIG. 3a, the typical proposed electrode structure 300 is comprised of alternating main bone electrodes 305, of width a, with adjacent trapezoid edge electrodes 310 of height h and tilt angle $\alpha$ of the trapezoid edge 310 to the normal of the main-bone electrodes 305. A series of thus formed trapezoid electrodes 300 are alternatively arranged to form the inter-digital electrodes.

Figure 3B:
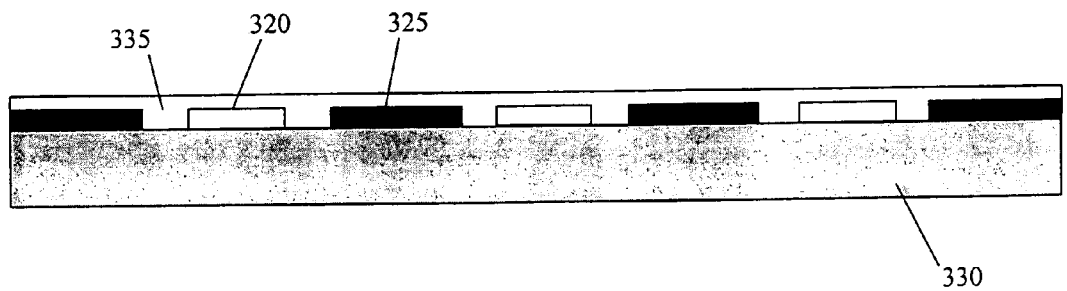
FIG. 3b shows a side view of the trapezoid electrode configuration of the T-FFS mode.

As shown in FIG. 3b, a side view of the electrode structure 300, the transparent pixel electrodes 320 and common electrodes 325 are deposited separately on the same substrate 330, where b is the distance between the neighboring pixel 320 and common electrodes 325. A passivation layer 335 is also prepared before the deposition of the pixel electrodes 320 to prevent the conduction of the neighboring electrodes. To make full use of the fringe field effect, the distance b is usually designed to be smaller than (a+2h) and the cell gap.

Figure 4:
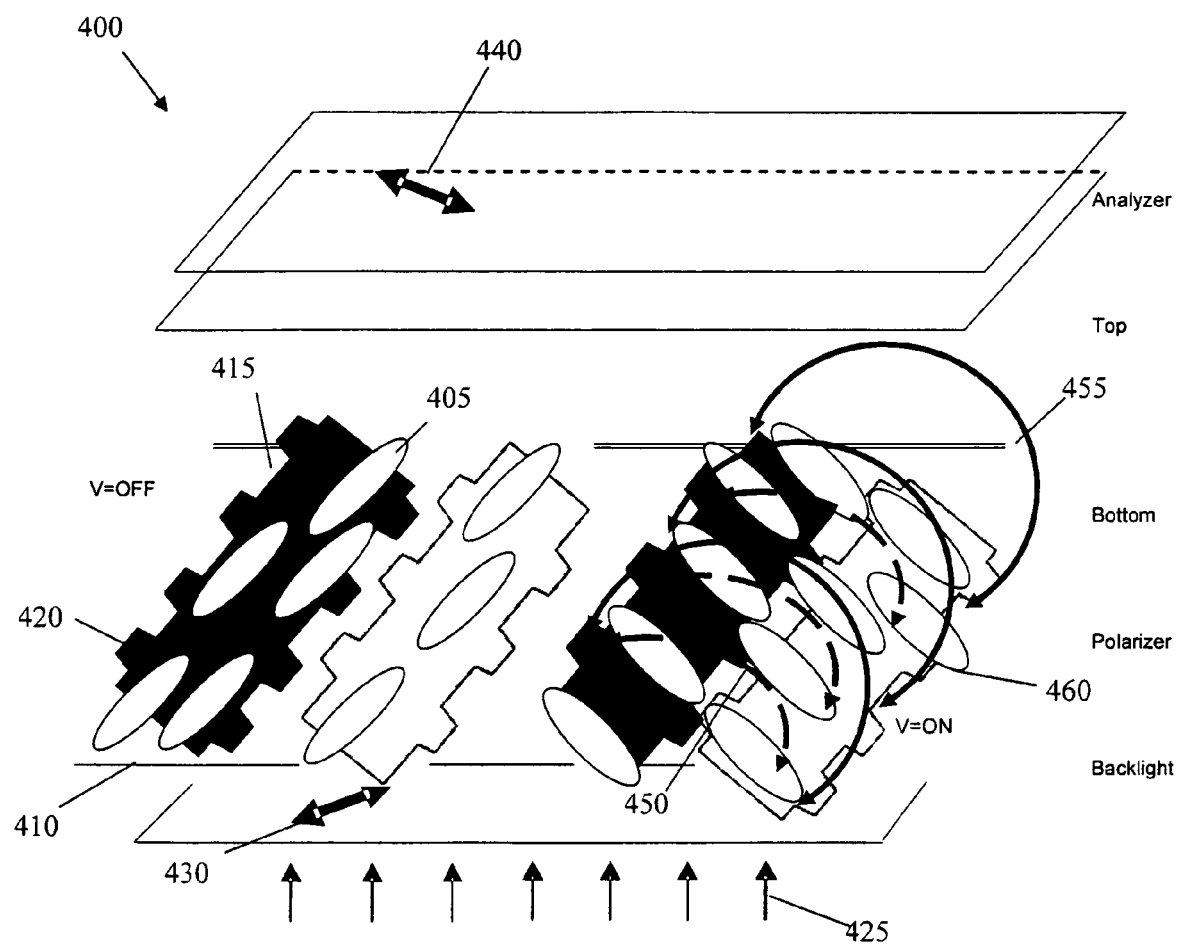
FIG. 4 shows a general device configuration of the trapezoid FFS mode.

FIG. 4 shows a proposed FFS mode LCD 400 using the trapezoid electrodes. The LC molecules 405 are aligned homogeneously on a glass or plastic substrate 410. The rubbing direction is at an angle $\Theta$ with respect to the main-bone 415 of the trapezoid electrodes 420. The principal axis of the polarizer 430 is parallel to the LC alignment (i.e., rubbing) direction. When there is no voltage applied, the incident light 425 is completely blocked by the crossed polarizers 430, 440, which results in a normally black state. When the applied voltage exceeds a threshold, the fringe electric field 450 is created and the electric field lines 455 are in the parabolic form in the whole display area. Correspondingly, the LC directors in-between them with $\Delta\epsilon>0$ would be reoriented along the electric field direction 450, and the LC directors in-between them with $\Delta\epsilon<0$ would be reoriented perpendicular to the electric field direction 450. Therefore, light transmits through the crossed polarizers 430, 440. Since the LC molecules 460 situated on the top surfaces of the electrodes are also reoriented by the electric field 450, the light transmittance should be quite high.

For explanation and comparison purposes, the following three embodiments using $\Delta\epsilon>0$ and $\Delta\epsilon<0$ LC materials are described as examples.

Embodiment 1

FIGS. 3 and 4 show the trapezoid electrode structures and LC directors, respectively. The main-bone width 305 of the common 325 and pixel 320 electrodes, a, and the height of the trapezoid edge 310 electrode, h, are usually at approximately 1 to approximately 10 μm. A passivation layer 335, such as $SiO_2$, of a thickness greater than approximately 1 μm, was deposited between the pattern process of the common electrode 325 and pixel electrode 320.

The ratio, $\beta$, the ratio of the distance between the neighboring common 325 and pixel 320 electrodes and the electrode width 305 (b/a), is designed so that $0<\beta\leq 1$ approximately 1 for complete fringe field switching. The tilt angle of the trapezoid edge to the normal of the main-bone electrodes α is selected so that 0°<α≦approximately 90°, although it is preferably approximately 45°. Under the present embodiment, a=approximately 2 μm, h=approximately 1 μm and α=approximately 45°. The cell gap between the top and bottom substrates is d=approximately 5 μm. A positive Δε LC material MLC-6692 (from Merck) is used for simulations. The LC parameters are: birefringence Δn=approximately 0.085, dielectric anisotropy Δε=approximately 10.3 and rotational viscosity γ$_1$=approximately 0.1 Pa·s. The LC has homogenous alignment in the initial state. Its azimuthal angle is approximately 10° and the pretilt angle is approximately 2°.

Figure 5:
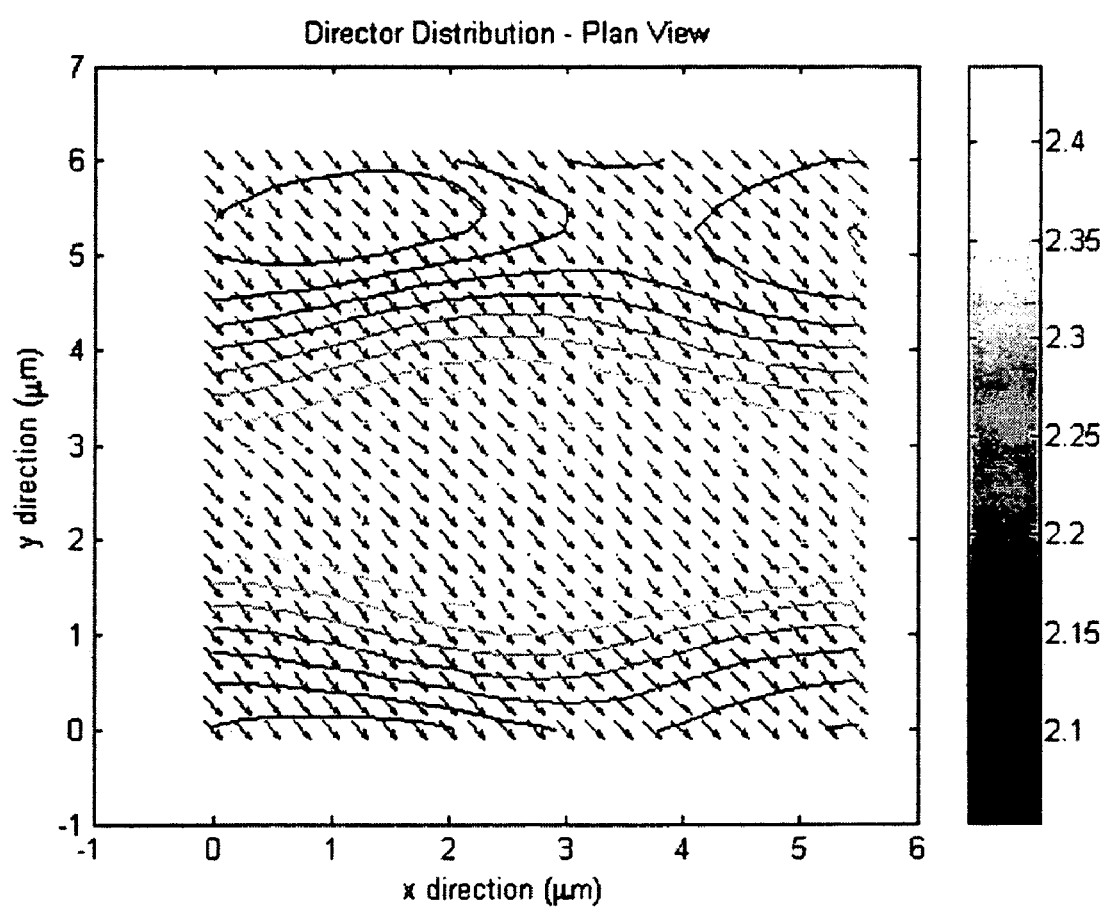
FIG. 5 shows the simulated LC director distribution of the trapezoid FFS mode using a positive LC material (Merck MLC-6692: Δn=0.085, Δε=10.3, $γ_1$=0.1 Pa·s and Δn·d=425 nm) as an example. The applied voltage is V=4.5 $V_{rms}$.

FIG. 5 shows the simulated LC director distribution of this embodiment when the applied voltage is approximately 4.5 V$_{rms}$. The LC directors are reoriented along the electric field direction due to the fringing field effect.

Figure 6:
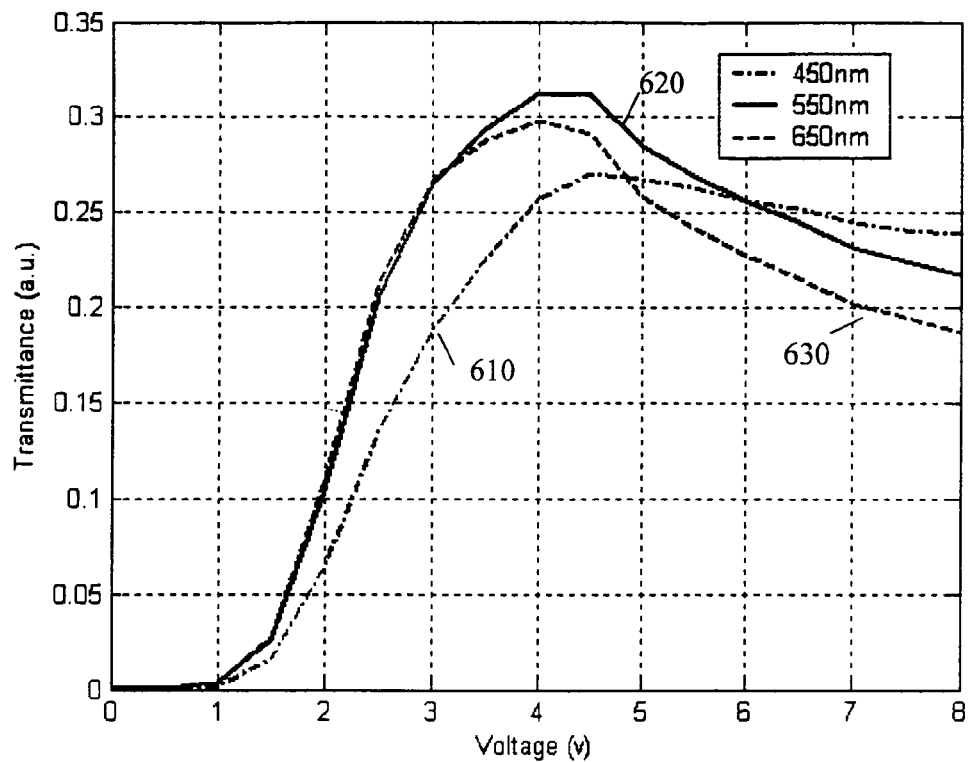
FIG. 6 shows the voltage-dependent transmittance of the trapezoid FFS mode using a positive LC material (Merck MLC-6692: Δn=0.085, Δε=10.3, $γ_1$=0.1 Pa·s and Δn·d=425 nm) at λ=450, 550, and 650 nm, respectively.

Referring to FIG. 3a, the LC directors above the pixel electrode 320 and common electrode 325 are reoriented and uniformly aligned by the electric field. FIG. 6 shows the voltage-dependent transmittance of the device at three primary wavelengths λ=approximately 450 nm, 610, λ=approximately 550 nm, 620 and λ=approximately 650 nm, 630 respectively. The maximum transmittance reaches approximately 32% at approximately 4.5 V$_{rms}$. For a pair of parallel polarizers alone, the transmittance is approximately 35%. Thus, the light modulation efficiency of the trapezoid FFS cell is 32/35=approximately 91%, which is comparable with the conventional FFS mode.

Figure 7:
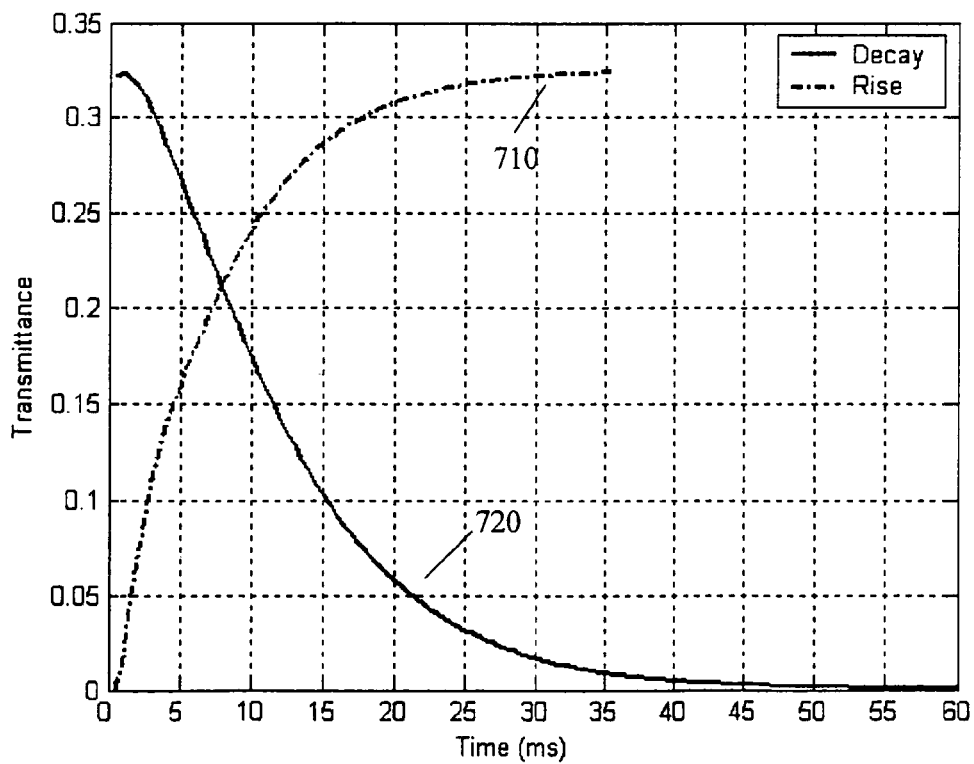
FIG. 7 shows the response time of the trapezoid FFS mode using a positive LC material (Merck MLC-6692: Δn=0.085, Δε=10.3, $γ_1$=0.1 Pa·s and Δn·d=425 nm) at V=4.5 $V_{rms}$.
Figure 8:
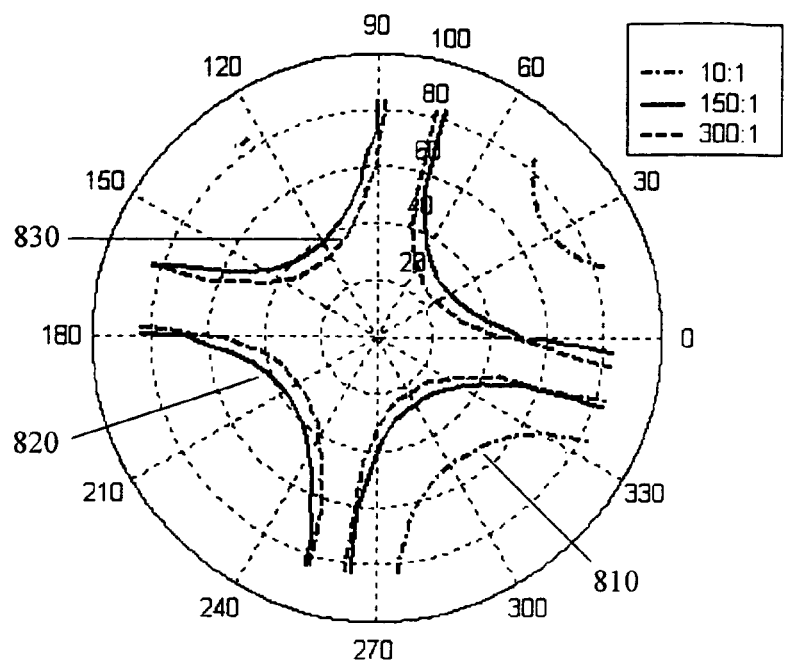
FIG. 8 shows the view angle of the trapezoid FFS mode using a positive LC material (Merck MLC-6692: Δn=0.085, Δε=10.3, $γ_1$=0.1 Pa·s and Δn·d=425 nm) at V=4.5 $V_{rms}$.

The threshold voltage of the improved FFS mode depends on the azimuthal angle. In the simulation, Θ=approximately 10° and V$_{th}$~1V$_{rms}$. As FIG. 7 shows, the rise time 710 is approximately 17 ms when the applied voltage is approximately 4.5 V$_{rms}$. FIG. 8 shows the view angle properties of the proposed device. The iso-contrast bars at approximately 10:1, 810, 150:1, 820, and 300:1, 830, are plotted as the function of the incident and azimuthal angles respectively. Its viewing cone is wider than ±approximately 70° for approximately 10:1, 810.

For comparsion purposes, the conventional IPS mode was used as the benchmark, where the electrode width is approximately 4 μm, and the distance between the neighboring electrodes is approximately 8 μm, while the LC materials and other device parameters are the same as those of the proposed T-FFS mode.

Figure 9:
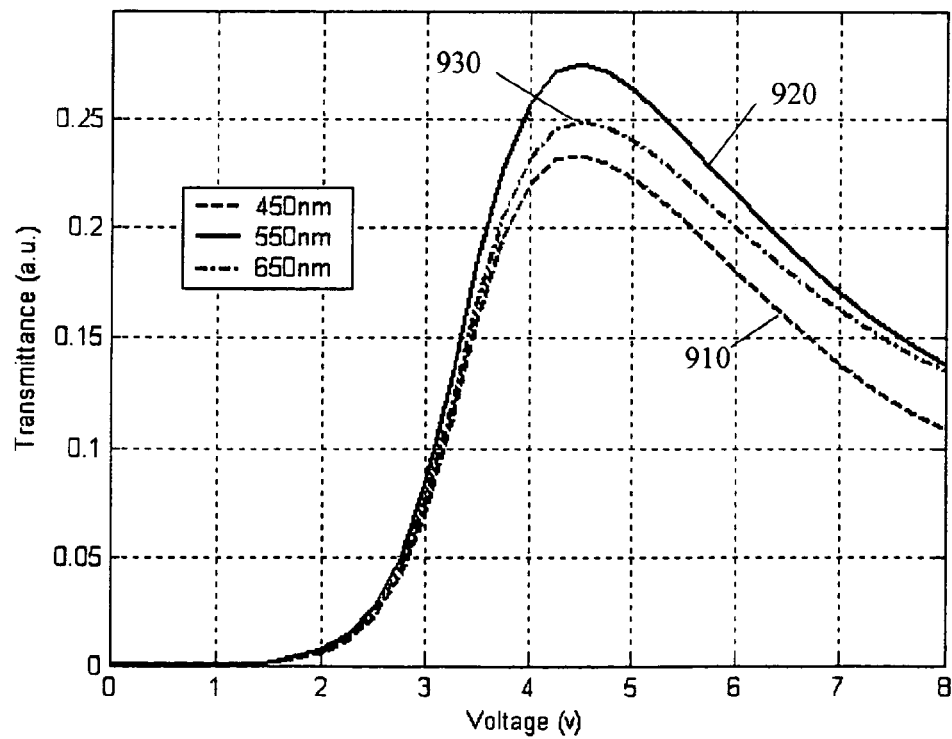
FIG. 9 shows the voltage-dependent transmittance of the conventional IPS mode using a positive LC material (Merck MLC-6692: $\Delta n=0.085$, $\Delta\epsilon=10.3$, $\gamma_1=0.1$ Pa·s and $\Delta n \cdot d=425$ nm) at $\lambda=450$, 550, and 650 nm, respectively.

FIG. 9 shows the voltage-dependent transmittance of the conventional IPS mode at three primary wavelengths λ=approximately 450 nm, 910, λ=approximately 550, 920 and λ=approximately 650 nm, 930 respectively. Its maximum transmittance is approximately 27% at the applied voltage of approximately 4.5 V$_{rms}$.

Figure 10:
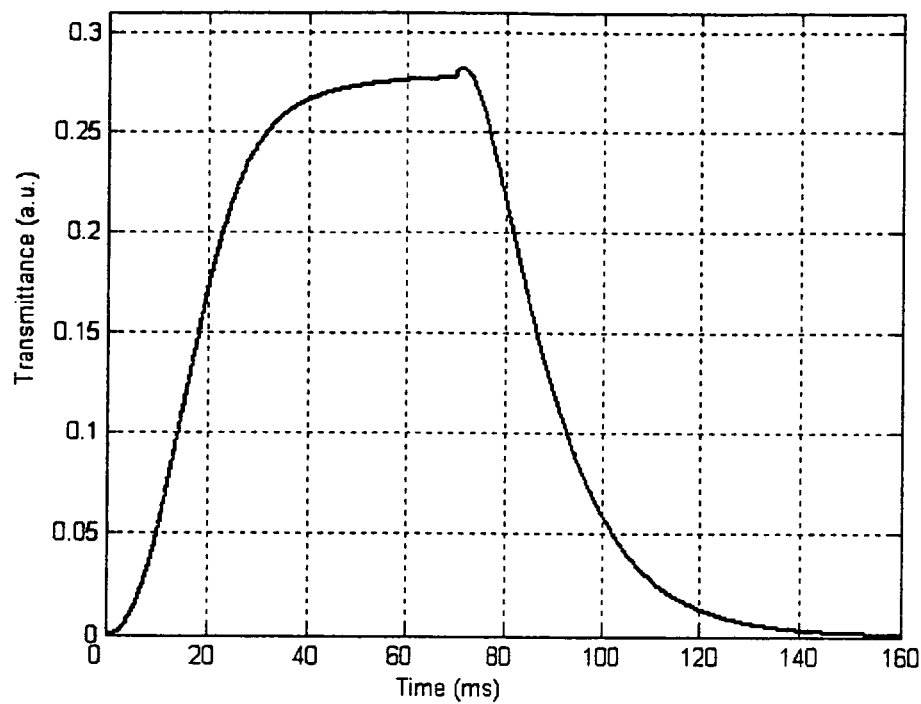
FIG. 10 shows the calculated response time of the IPS mode using a positive LC material (Merck MLC-6692: $\Delta n=0.085$, $\Delta\epsilon=10.3$, $\gamma_1=0.1$ Pa·s and $\Delta n \cdot d=425$ nm) at $V=4.5$ $V_{rms}$.
Figure 11:
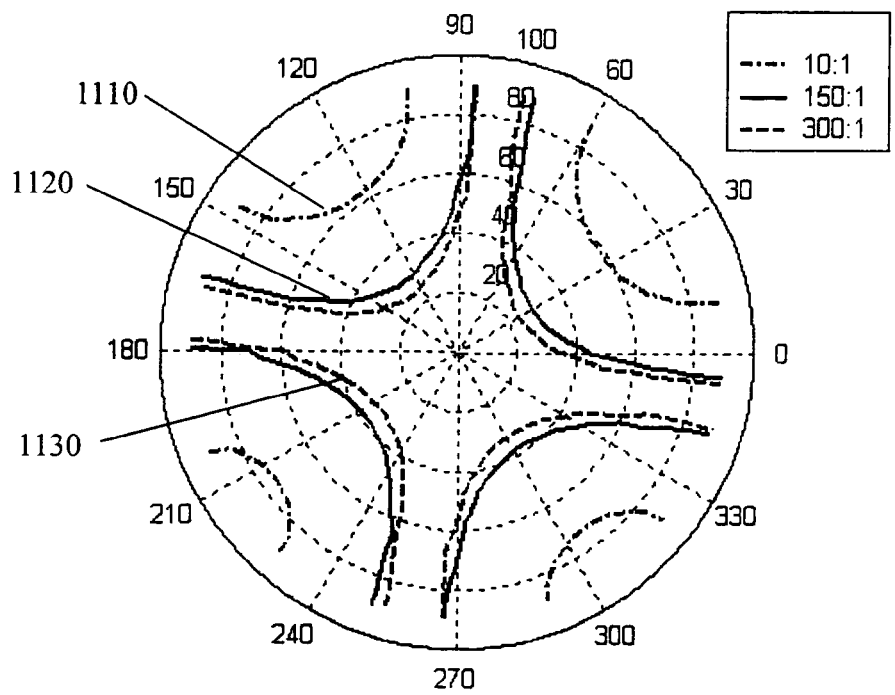
FIG. 11 shows the view angle of the IPS mode using a positive LC material (Merck MLC-6692: $\Delta n=0.085$, $\Delta\epsilon=10.3$, $\gamma_1=0.1$ Pa·s and $\Delta n \cdot d=425$ nm) at $V=4.5$ $V_{rms}$.

FIG. 10 plots the response time of the IPS mode, which is approximately 32 ms during its rise period. The decay time of a LC cell is proportional to $\gamma_1 d^2/K\pi^2$; where d is the cell gap, γ$_1$ is the rotational viscosity, the K is the corresponding elastic constant. The decay time of the IPS and the trapezoid FFS is approximately 35 and approximately 30 ms, respectively. FIG. 11 shows the iso-contrast plot of the viewing angle of the IPS mode. The iso-contrast bars at 10:1, 1110, 150:1, 1120, and 300:1, 1130, are plotted as the function of the incident and azimuthal angles respectively. The trapezoid FFS mode exhibits a slightly wider viewing angle than IPS. Thus, the T-FFS mode has approximately 20% higher transmission efficiency, faster response time, and wider view angle than those of the IPS mode.

Embodiment 2

FIGS. 3 and 4 show the trapezoid electrode structures and LC directors, respectively. The main-bone width 305 of the common 325 and pixel 320 electrodes, a, and the height of the trapezoid edge 310 electrode, h, are usually at approximately 1 to approximately 10 μm. A passivation layer 335, such as SiO$_2$, of a thickness greater than approximately 1 μm, was deposited between the pattern process of the common electrode 325 and pixel electrode 320. The ratio, β, the ratio of the distance between the neighboring common 325 and pixel 320 electrodes and the electrode width 305 (b/a), is designed so that 0<β≦1 approximately 1 for complete fringe field switching.

The tilt angle of the trapezoid edge to the normal of the main-bone electrodes α is selected so that 0°<α≦approximately 90°, although it is preferably approximately 45°. Under the present embodiment, a=approximately 3 μm, h=approximately 1 μm and α=approximately 45°. The cell gap between the top and bottom substrates is d=approximately 4.8 μm. A positive Δε LC material MLC-6692 (from Merck) is used for simulations. The LC parameters are: birefringence Δn=approximately 0.085, dielectric anisotropy Δε=approximately 10.3 and rotational viscosity γ$_1$=approximately 0.1 Pa·s. The LC has homogenous alignment in the initial state. Its azimuthal angle is approximately 10° and the prelit angle is approximately 2°.

Figure 12:
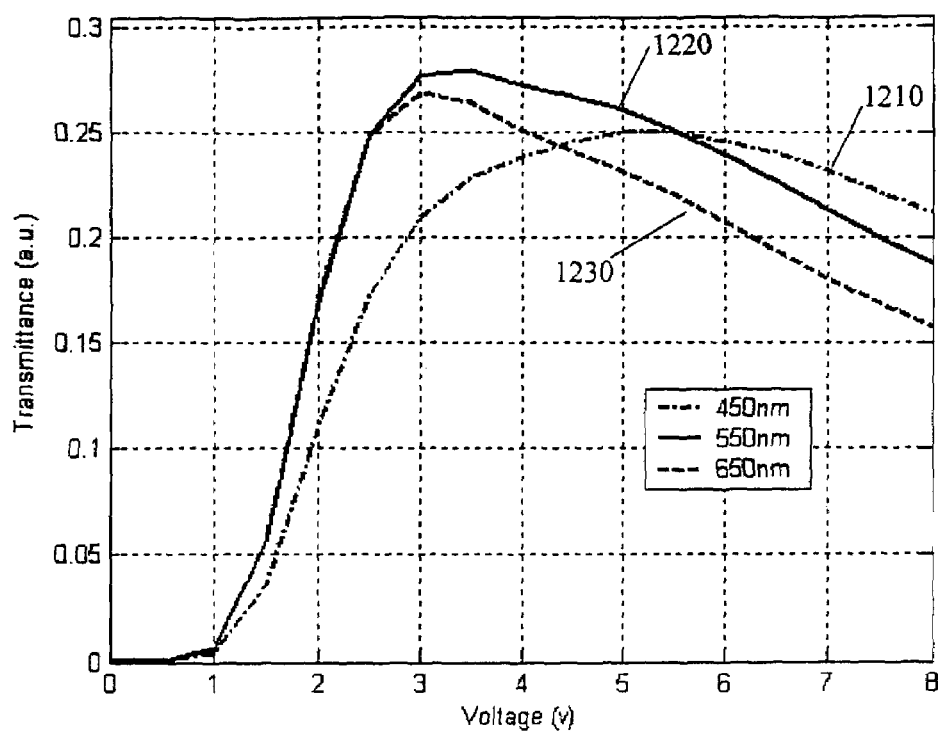
FIG. 12 shows the voltage-dependent transmittance of the trapezoid FFS mode using a positive LC material (Merck MCL-6692: $\Delta n=0.085$, $\Delta\epsilon=10.3$, $\gamma_1=0.1$ Pa·s and $\Delta n \cdot d=408$ nm) in the second embodiment at $\lambda=450$, 550, and 650 nm, respectively.

FIG. 12 shows the voltage-dependent transmittance of the device at three primary wavelengths λ=approximately 450 nm, 1210, λ=approximately 550 nm, 1220, and λ=approximately 650 nm, 1230 respectively. The maximum transmittance reaches approximately 28.3% at approximately 3.5 V$_{rms}$ under λ=approximately 550 nm, 1220. The threshold voltage of the improved FFS mode depends on the azimuthal angle. In the simulation, Θ is approximately 10° and V$_{th}$ is smaller than approximately 1 V$_{rms}$.

Figure 13:
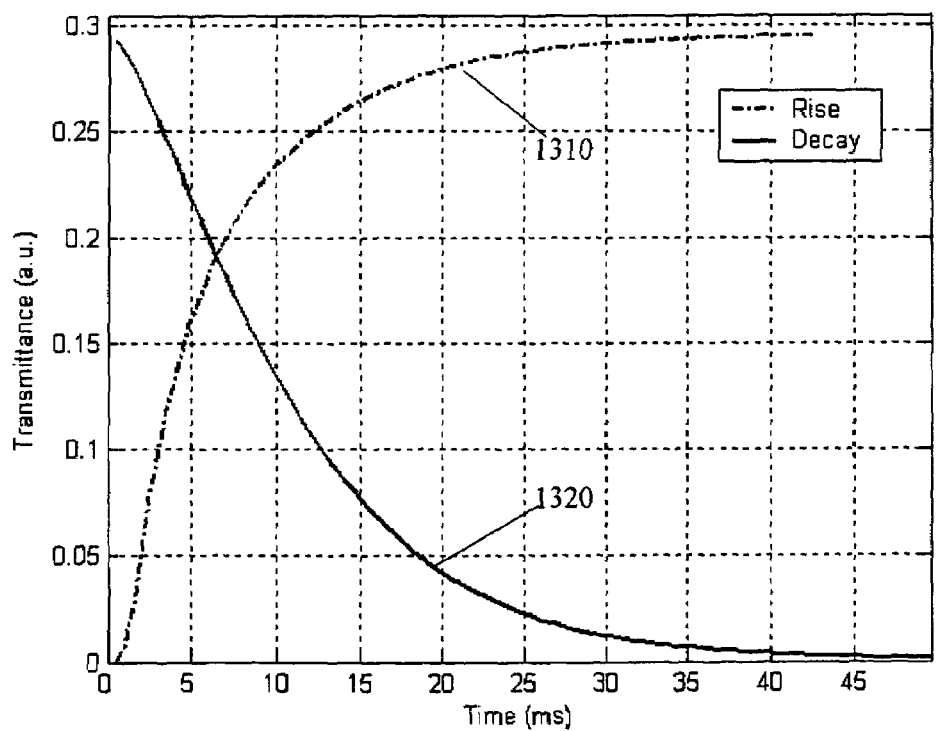
FIG. 13 shows the response time of the trapezoid FFS mode using a positive LC material (Merck MLC-6692: $\Delta n=0.085$, $\Delta\epsilon=10.3$, $\gamma_1=0.1$ Pa·s and $\Delta n \cdot d=408$ nm) at $V=3.5$ $V_{rms}$ in the second embodiment.
Figure 14:
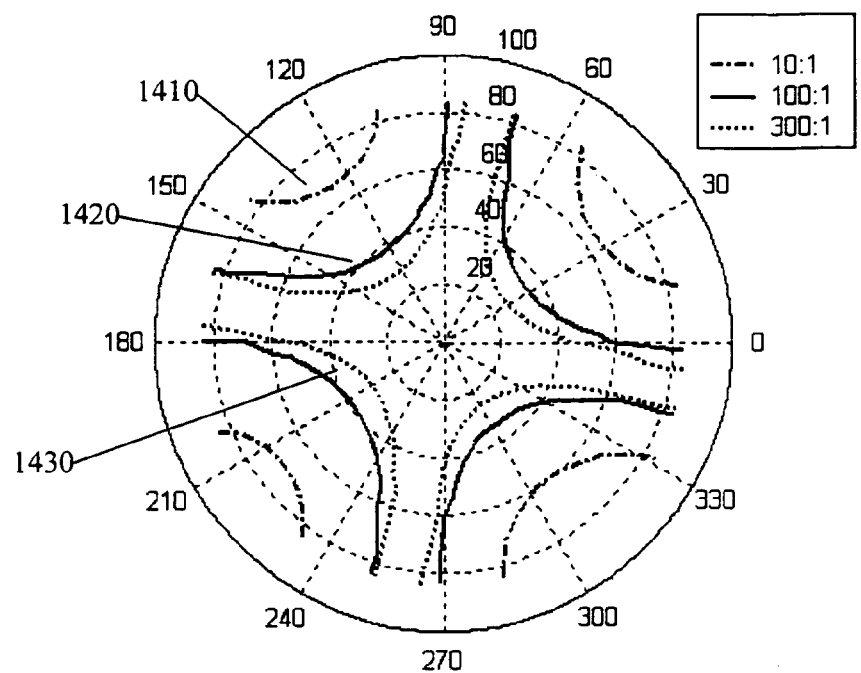
FIG. 14 shows the view angle of the trapezoid FFS mode using a positive LC material (Merck MLC-6692: $\Delta n=0.085$, $\Delta\epsilon=10.3$, $\gamma_1=0.1$ Pa·s and $\Delta n \cdot d=408$ nm) at $V=3.5$ $V_{rms}$ in the second embodiment.

As FIG. 13 shows, the rise time 1310 is approximately 18 ms when the applied voltage is approximately 3.5 V$_{rms}$. FIG. 14 shows the view angle properties of the proposed device. The iso-contrast bars at approximately 10:1, 1410, 100:1, 1420, and 300:1, 1430, are plotted as the function of the incident and aximuthal angles respectively. Its viewing cone can reach approximately ±70° for approximately 10:1, 1410.

Figure 15:
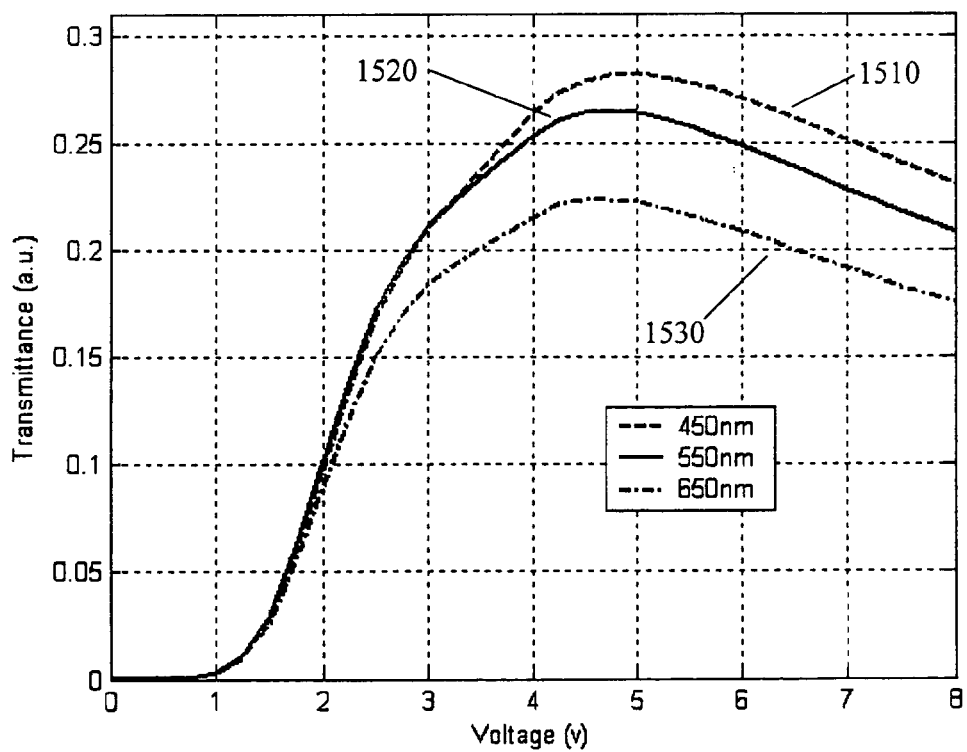
FIG. 15 shows the voltage-dependent transmittance of the conventional FFS mode using a positive LC material (Merck MLC-6692: $\Delta n=0.085$, $\Delta\epsilon=10.3$, $\gamma_1=0.1$ Pa·s and $\Delta n \cdot d=408$ nm) at $\lambda=450$, 550, and 650 nm, respectively.
Figure 16:
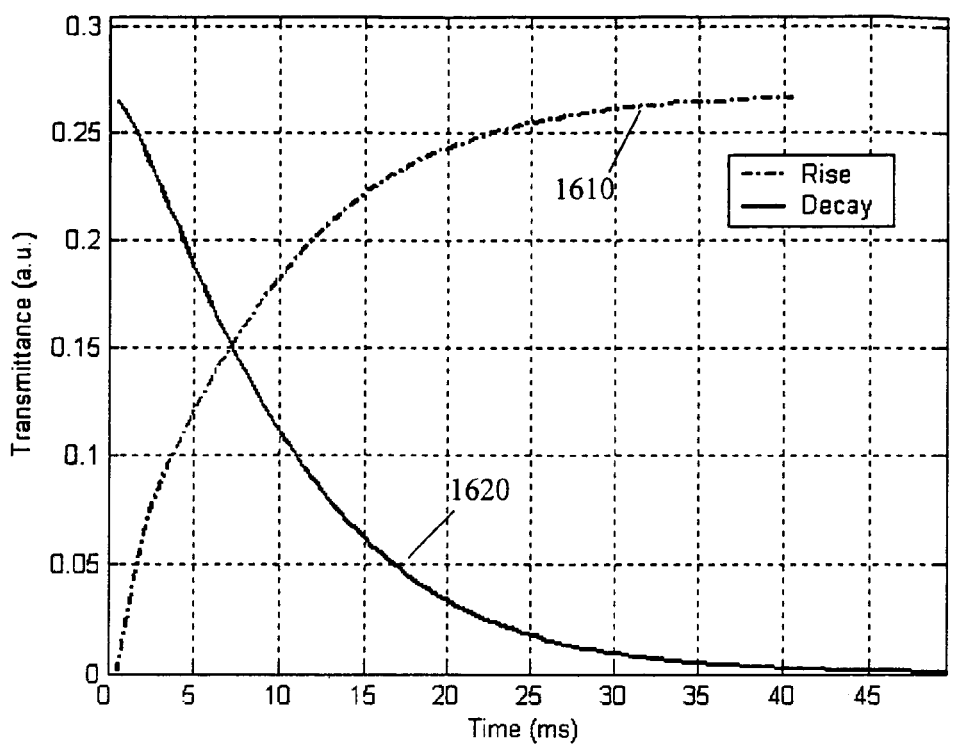
FIG. 16 shows the calculated response time of the conventional FFS mode using a positive LC material (Merck MLC-6692: $\Delta n=0.085$, $\Delta\epsilon=10.3$, $\gamma_1 0.1$ Pa·s and $\Delta n \cdot d=408$ nm) at $V=4.75$ $V_{rms}$.

For comparison purposes, the conventional FFS mode was used as the benchmark, where the LC materials and other device parameters are the same as those of the above T-FFS mode. FIG. 15 shows the voltage-dependent transmittance of the conventional FFS mode at three primary wavelengths λ=approximately 450 nm, 1510, λ=approximately 550 nm, 1520, and λ=approximately 650 nm, 1530 respectively. Its maximum transmittance is approximately 26.5% at the applied voltage of approximately 4.75 V$_{rms}$ for λ=approximately 550 nm, 1520. Therefore, the T-FFS mode has a higher transmittance than the conventional FFS mode. What is more remarkable, a much lower operating voltage of approximately 3.5 V$_{rms}$ is needed to achieve this. The response time 1610 of the conventional FFS mode under the applied voltage of approximately 4.75 V$_{rms}$ is plotted as shown in FIG. 16, and is approximately 19.5 ms. The decay time of a LC cell is proportional to $\gamma_1 d^2/K\pi^2$; where d is the cell gap, γ$_1$ is the rotational viscosity, and K is the corresponding elastic constant. The decay times of the conventional FFS and T-FFS 1620 are both approximately 25 ms.

Figure 17:
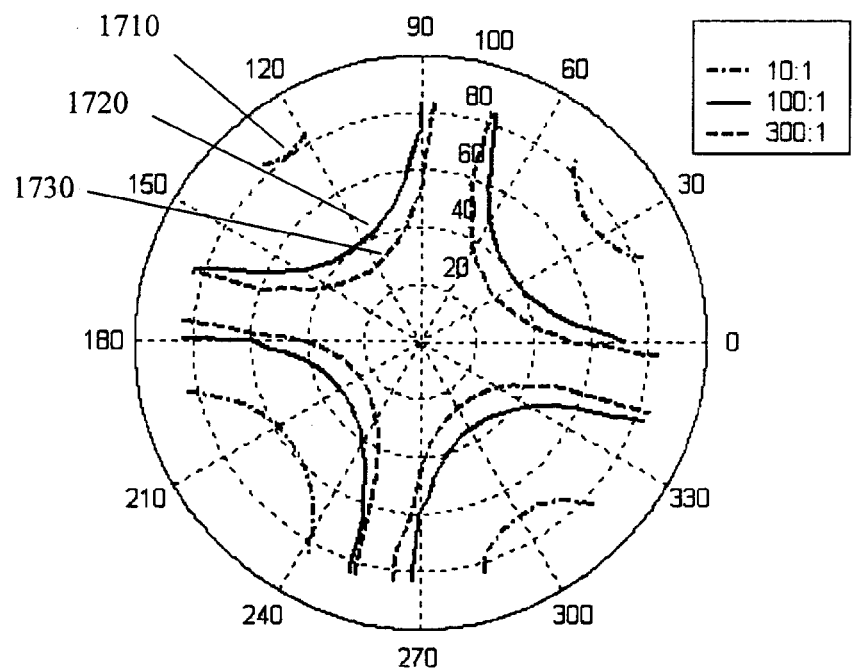
FIG. 17 shows the view angle of the conventional FFS mode using a positive LC material (Merck MLC-6692: $\Delta n=0.085$, $\Delta\epsilon=10.3$, $\gamma_1=0.1$ Pa·s and $\Delta n \cdot d=408$ nm) at $V=4.75$ $V_{rms}$.

FIG. 17 shows the iso-contrast plot of the viewing angle of the conventional FFS mode at the applied voltage of approximately 4.75 V$_{rms}$. The iso-contrast bars at 10:1, 1710, 100:1, 1720, and 300:1, 1730, are plotted as the function of the incident and azimuthal angles respectively. Its viewing cone is also approximately ±approximately 70° for approximately 10:1, 1710. Thus, the T-FFS mode shows the similar wide view ability while having a lower operating voltage, higher light transmission efficiency, and a faster response time than those of the conventional FFS mode.

Embodiment 3

The basic LC device structures are the same as those shown in FIGS. 3 and 4, except that the negative LC is used. The main-bone width 305 of the common 325 and pixel 320 electrodes, a, and the height of the trapezoid edge 310 electrode, h, are usually at approximately 1 to approximately 10 μm. A passivation layer 335, such as $SiO_2$, of a thickness greater than approximately 1 μm, was deposited between the pattern process of the common electrode 325 and pixel electrode 320. The ratio, β, the ratio of the distance between the neighboring common 325 and pixel 320 electrodes and the electrode width 305 (b/a), is designed so that $0<\beta \leq 1$ for complete fringe field switching. The tilt angle of the trapezoid edge to the normal of the main-bone electrodes α is selected so that $0°<\alpha \leq$ approximately 90°, although it is preferably approximately 45°.

Under the present embodiment, a=approximately 3 μm, h=approximately 1 μm and α=approximately 45°. The cell gap between the top and bottom substrates is d=approximately 4 μm. a negative Δε LC mixture MLC-6609 (from Merck) has following parameters: birefringence Δn=approximately 0.0777, dielectric anisotropy Δε=approximately −3.7 and rotational viscosity $\gamma_1$=approximately 0.16 Pa·s. The LC is homogenously aligned along the rubbing direction in the initial state. Its azimuthal angle is approximately 80° and the prelit angle is approximately 2°.

Figure 18:
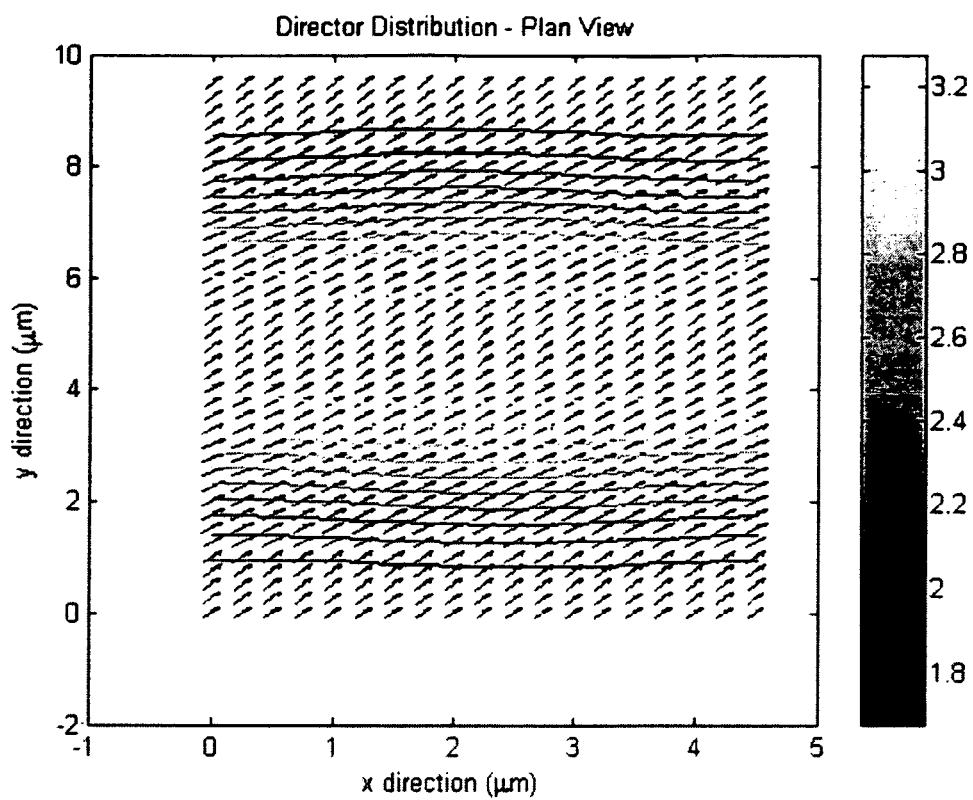
FIG. 18 shows the simulated LC director distribution of the trapezoid FFS mode using a negative LC material (Merck MLC-6609: $\Delta n=0.0777$, $\Delta\epsilon=-3.7$, $\gamma_1=0.16$ Pa·s and $\Delta n \cdot d=311$ nm) as an example. The applied voltage is $V=5$ $V_{rms}$.

FIG. 18 shows the LC director distribution of this embodiment when the applied voltage is approximately 5 $V_{rms}$. The LC directors are reoriented perpendicular to the electric field direction due to the negative Δε involved. From the top view, the LC molecules above the pixel and common electrodes are also driven and twisted by the electric field. Unlike the IPS mode, the T-FFS cell has no dead zones.

Figure 19:
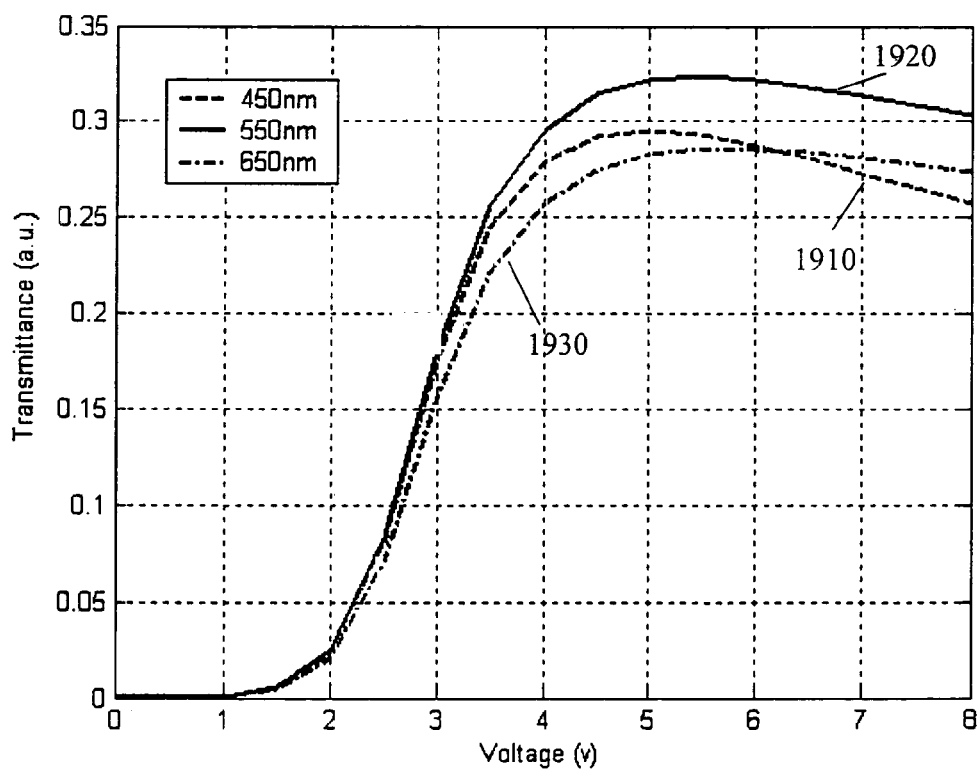
FIG. 19 shows the voltage-dependent transmittance of the trapezoid FFS mode using a negative LC material (Merck MLC-6609: $\Delta n=0.0777$, $\Delta\epsilon=-3.7$, $\gamma_1=0.16$ Pa·s and $\Delta n \cdot d=311$ nm) at $\lambda=450$ nm, 550 nm, and 650 nm, respectively.

FIG. 19 plots the voltage-dependent transmittance of the trapezoid FFS cell at three primary wavelengths λ=approximately 450 nm, 1910, λ=approximately 550 nm, 1920, and λ=approximately 650 nm, 1930 respectively. The maximum transmittance occurs at approximately 32.5% at approximately 5 $V_{rms}$.

Figure 20:
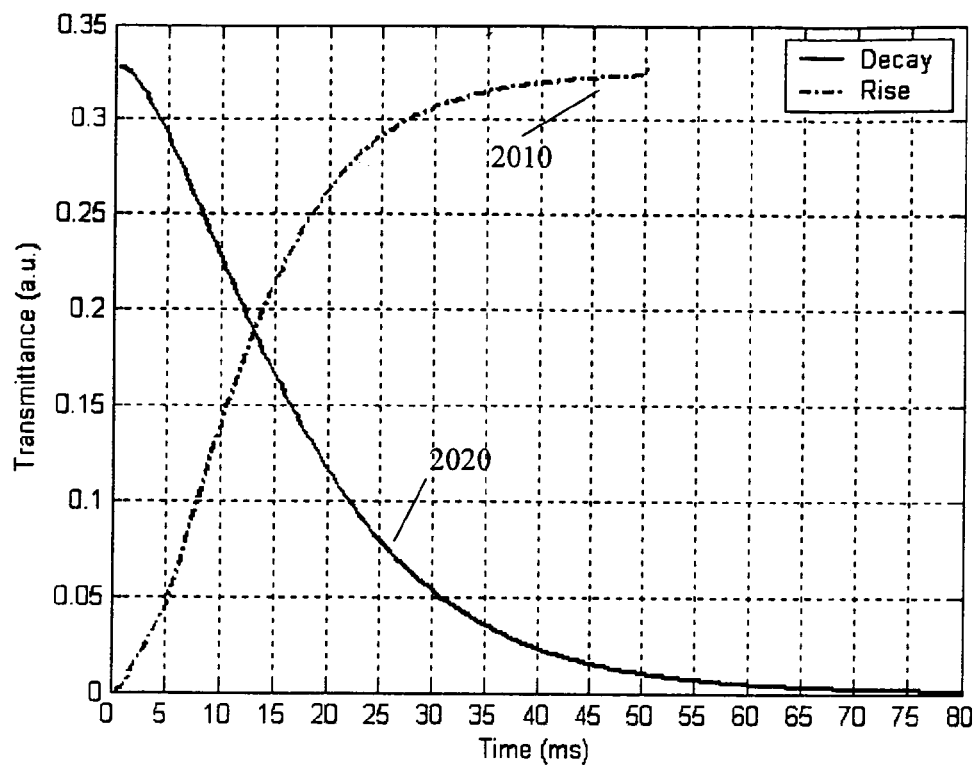
FIG. 20 shows the response time of the trapezoid FFS mode using a negative LC material (Merck MLC-6609: $\Delta n=0.0777$, $\Delta\epsilon=-3.7$, $\gamma_1=0.16$ Pa·s and $\Delta n \cdot d=311$ nm) at $V=5$ $V_{rms}$.
Figure 21:
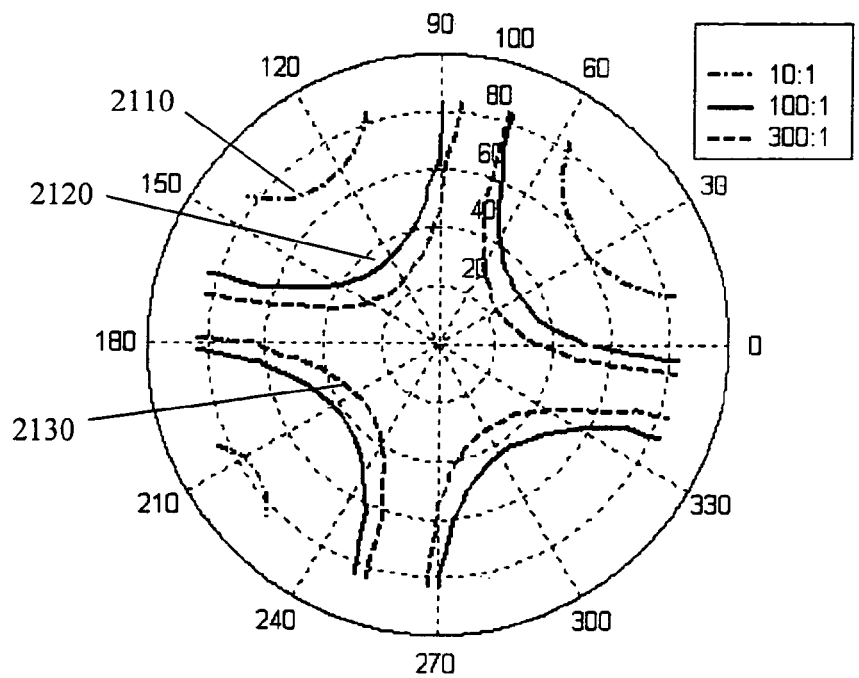
FIG. 21 shows the view angle of the trapezoid FFS mode using a negative LC material (Merck MLC-6609: $\Delta n=0.0777$, $\Delta\epsilon=-3.7$, $\gamma_1=0.16$ Pa·s and $\Delta n \cdot d=311$ nm) at $V=5$ $V_{rms}$.

As FIG. 20 shows, the T-FFS mode has the rise time 2010 of approximately 25 ms when the applied voltage is approximately 5 $V_{rms}$. FIG. 21 plots the iso-contrast contour of the view angle characteristics of the proposed device embodiment. The iso-contrast bars at approximately 10:1, 2110, 100:1, 2120, and 300:1, 2130, are plotted as the function of the incident and azimuthal angles respectively. Similar to the trapezoid FFS device using a positive LC material, its viewing cone is wider than ±approximately 70° for approximately 10:1, 2110.

Figure 22:
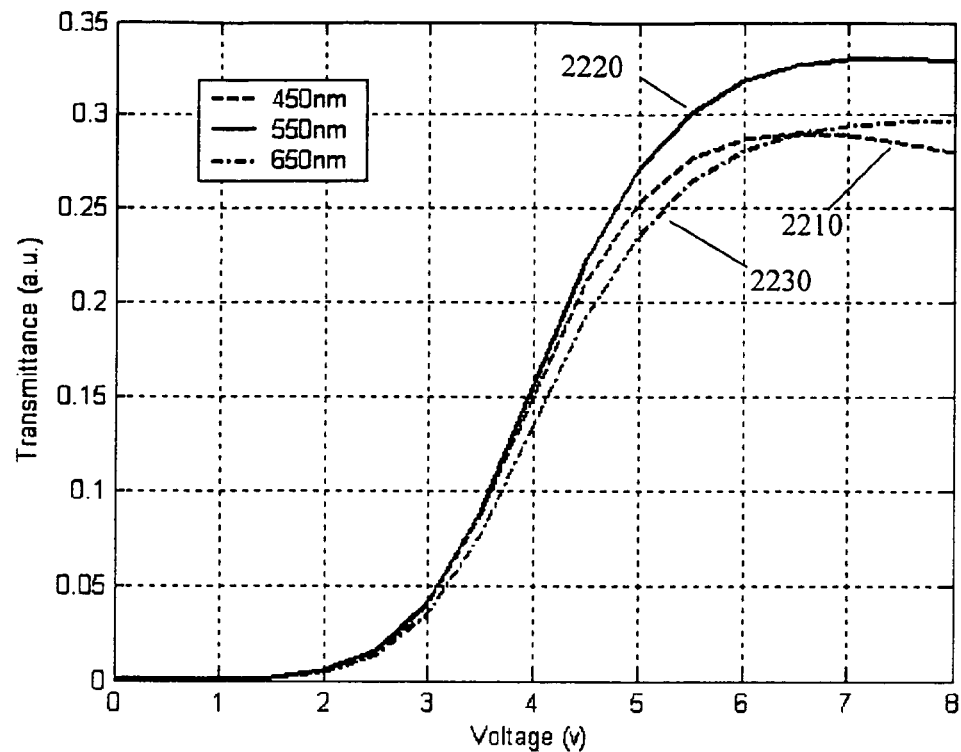
FIG. 22 shows the voltage-dependent transmittance of the conventional FFS mode using a negative LC material (Merck MLC-6609: $\Delta n=0.0777$, $\Delta\epsilon=-3.7$, $\gamma_1=0.16$ Pa·s and $\Delta n \cdot d=311$ nm) at $\lambda=450$, 550, and 650 nm, respectively.

For comparison purposes, the voltage-dependent transmittance curve using the rectangular shape electrodes with the same device parameters as published by S. H. Lee et al. in Applied Physics Letters, vol.73, p.2881 (1995) was also simulated. The result is shown in FIG. 22 at three primary wavelengths λ=approximately 450 nm, 2210, λ=approximately 550 nm, 2220, and λ=approximately 650 nm, 2230 respectively. It can be seen that the trapezoid FFS mode has a lower threshold voltage and the transmittance is comparable to that of the conventional FFS mode. Most importantly, the maximum transmittance voltage has been reduced from approximately 7 to approximately 5 $V_{rms}$. The lower operating voltage is desirable because the required TFT power consumption is lower.

Figure 23:
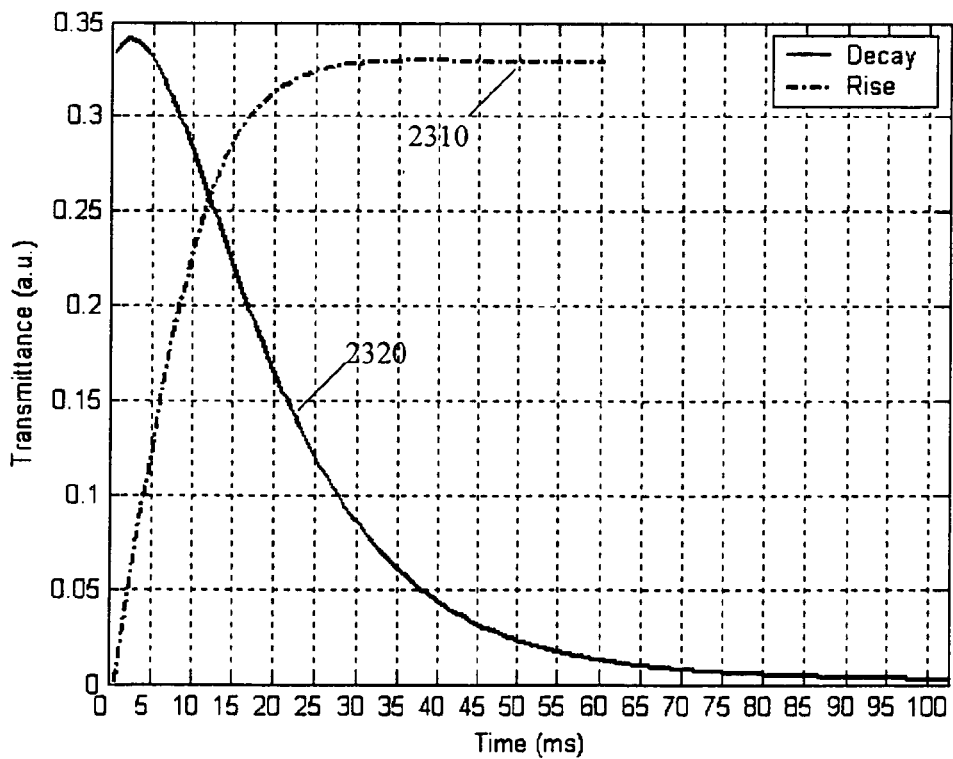
FIG. 23 shows the response time of the conventional FFS mode using a negative LC material (Merck MLC-6609: $\Delta n=0.0777$, $\Delta\epsilon=-3.7$, $\gamma_1=0.16$ Pa·s and $\Delta n \cdot d=311$ nm) at $V=7$ $V_{rms}$.
Figure 24:
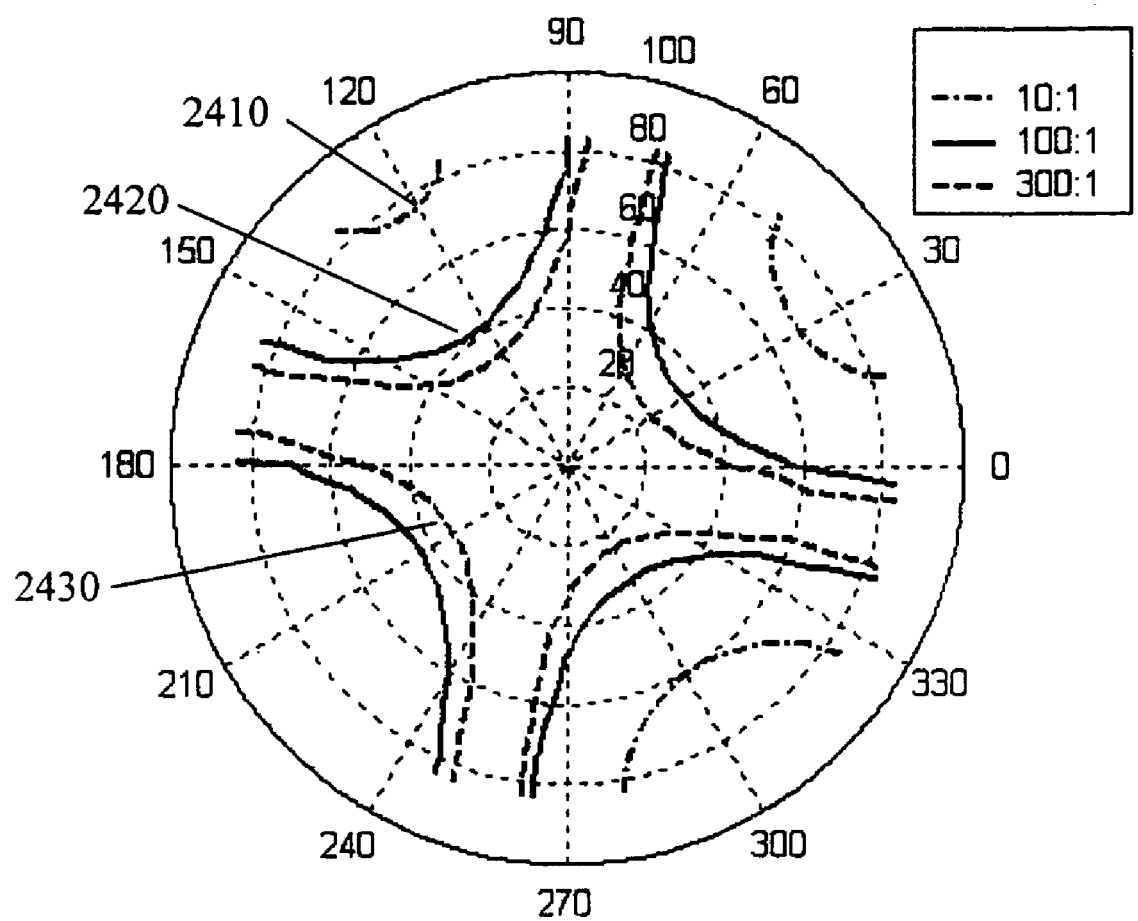
FIG. 24 shows the view angle of the conventional FFS mode using a negative LC material (Merck MLC-6609: $\Delta n=0.0777$, $\Delta\epsilon=-3.7$, $\gamma_1=0.16$ Pa·s and $\Delta n \cdot d=311$ nm) at $V=7$ $V_{rms}$.

FIG. 23 shows the response time 2310 of the conventional FFS using the negative LC material MLC-6609. Its rise time is approximately 22 ms when the applied voltage is approximately 7 $V_{rms}$. FIG. 24 plots the iso-contrast contour of the view angle characteristics of the proposed device embodiment. The iso-contrast bars at approximately 10:1, 2410, 100:1, 2420, and 300:1, 2430, are plotted as the function of the incident and azimuthal angles respectively. Similar to the T-FFS device using the LC material, its viewing cone is wider than ±approximately 70° for approximately 10:1, 2410. Therefore, the T-FFS using the negative LC material has nearly the same high transmittance, fast response time, and wide view angle as that of the conventional FFS while requiring a much lower operating voltage to drive, which is desirable for practical applications.

While the invention has been described, disclosed, illustrated, and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as the fall within the breadth and scope of the claims here appended.

We claim:

1. A fringe field switching mode liquid crystal display comprising:
    (a) a first substrate;
    (b) a second substrate;
    (c) a plurality of elongated pixel electrodes and common electrodes having alternating sections of main bone electrode with trapezoidal shaped electrode disposed adjacent to each other in each pixel region of a liquid crystal side surface of said first substrate, each of said pixel region including one pixel electrode and one common electrode disposed on the same substrate adjacent to one side of the one pixel electrode, wherein the width of the main-bone section of said one common and said one pixel electrodes is from approximately 1 to approximately 50 μm and the height of the trapezoid edge of said one common and said one pixel electrode is from approximately 1 to approximately 50 μm;
    (d) aligning layers formed on liquid crystal side of said first and said second substrate providing liquid crystal homogeneous alignment;
    (e) a liquid crystal material filling the space between said first and said second substrates as a liquid crystal cell; and
    (f) a linear polarizer disposed on each exterior surface of said liquid crystal cell respectively.

* * * * *